United States Patent
Lin et al.

(10) Patent No.: US 11,070,148 B2
(45) Date of Patent: Jul. 20, 2021

(54) TRIBOELECTRIC NANOGENERATOR STRUCTURE, SENSING SYSTEM AND DISINFECTING SYSTEM

(71) Applicant: NATIONAL TSING HUA UNIVERSITY, Hsinchu (TW)

(72) Inventors: Zong-Hong Lin, Hsinchu (TW); Che-Min Chiu, Taipei (TW); Yun-Ting Jao, Hsinchu (TW); Yi-Yun Ke, Kaohsiung (TW); Po-Kang Yang, Taoyuan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 194 days.

(21) Appl. No.: 16/352,814

(22) Filed: Mar. 13, 2019

(65) Prior Publication Data

US 2020/0161990 A1  May 21, 2020

(30) Foreign Application Priority Data

Nov. 21, 2018  (TW) .................. 107141527

(51) Int. Cl.
*H02K 1/04* (2006.01)
*H02N 1/04* (2006.01)
*H02N 11/00* (2006.01)

(52) U.S. Cl.
CPC .............. *H02N 1/04* (2013.01); *H02N 11/002* (2013.01)

(58) Field of Classification Search
CPC ........ H02N 11/00; H02N 11/002; H02N 1/04; G01N 27/00
See application file for complete search history.

(56) References Cited

U.S. PATENT DOCUMENTS

| | | | |
|---|---|---|---|
| 2002/0037466 A1* | 3/2002 | Kanbayashi | G03G 9/092 430/108.23 |
| 2012/0028173 A1* | 2/2012 | Willard | G03G 15/0803 430/30 |
| 2014/0084748 A1* | 3/2014 | Wang | H02N 1/04 310/300 |
| 2018/0346690 A1* | 12/2018 | Wu | C08B 37/003 |

OTHER PUBLICATIONS

Yun-Ting Jao et al., "A textile-based triboelectric nanogenerator with humidity-resistant output characteristic and its applications in self-powered healthcare sensors", Nano Energy, published in Aug. 2018, vol. 50, pp. 513-520 published by Elsevier Ltd., Netherlands.

(Continued)

*Primary Examiner* — Naishadh N Desai
(74) *Attorney, Agent, or Firm* — CKC & Partners Co., LLC

(57) ABSTRACT

A triboelectric nanogenerator structure is provided. The triboelectric nanogenerator structure is composed of an upper electrode layer, a lower triboelectric layer, a lower electrode layer and an electric connecting member. The upper electrode layer is composed of a hybrid gel. The lower triboelectric layer corresponding to the upper electrode layer has a first surface and a second surface, and the first surface faces toward the upper electrode layer. The lower electrode layer is disposed at the second surface. The electric connecting member connects the upper electrode layer to the lower electrode layer.

16 Claims, 20 Drawing Sheets

(56) References Cited

OTHER PUBLICATIONS

Che-Min Chiu et al., "Self-powered active antibacterial clothing through hybrid effects of nanowire-enhanced electric field electroporation and controllable hydrogen peroxide generation", Nano Energy, published in Nov. 2018, vol. 53, pp. 1-10, published by Elsevier Ltd., Netherlands.
Ruoxing Wang et al., "Engineered and Laser-Processed Chitosan Biopolymers for Sustainable and Biodegradable Triboelectric Power Generation", Advanced Materials, published on Mar. 15, 2018, vol. 30, issue 11, pp. 1-8, published by Wiley-VCH, Germany.

\* cited by examiner

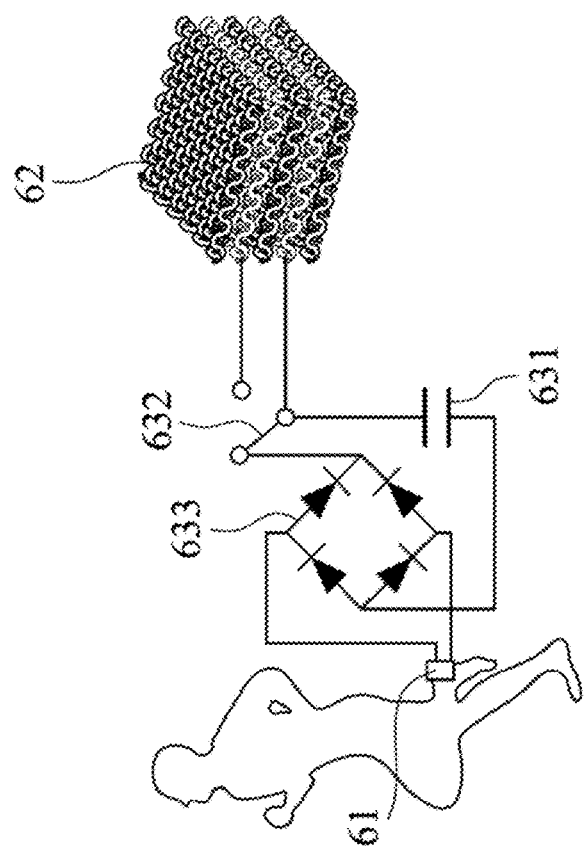
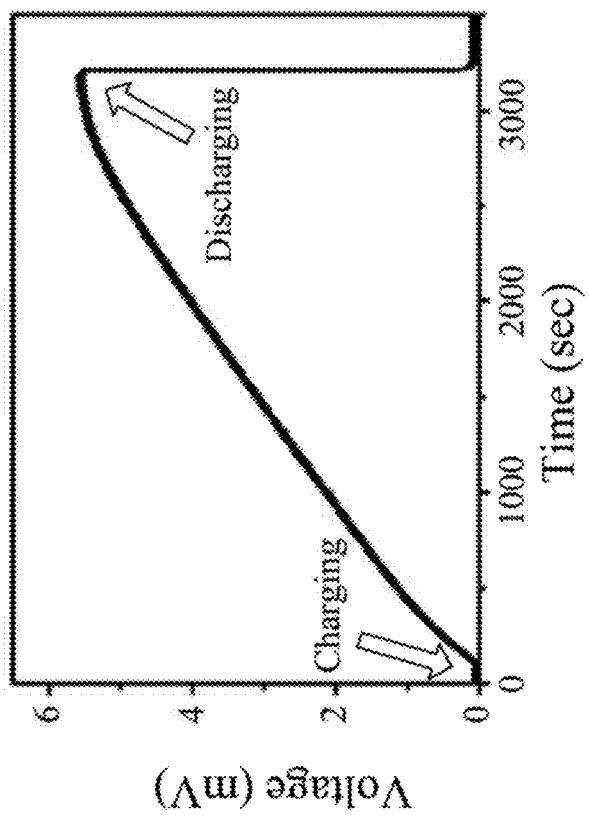
Fig. 22A
Fig. 22B

TRIBOELECTRIC NANOGENERATOR STRUCTURE, SENSING SYSTEM AND DISINFECTING SYSTEM

RELATED APPLICATIONS

This application claims priority to Taiwan Application Serial Number 107141527, filed Nov. 21, 2018, which is herein incorporated by reference.

BACKGROUND

Technical Field

The present disclosure relates to a triboelectric nanogenerator structure, a sensing system and a disinfecting system. More particularly, the present disclosure relates to a triboelectric nanogenerator structure, a sensing system and a disinfecting system including an upper electrode layer acted as both triboelectric and conductive materials.

Description of Related Art

Nowadays, owing to the progress of the technique, wearable electronic devices have received great attention, and various textile-based or textile-like components have been applied to fabricate the wearable electronic devices. In general, an extra power source is required to operate these kinds of wearable electronic devices. Hence, development of a proper power source for future wearable textile electronic devices has become an urgent matter.

Because the conventional batteries are not suitable to combine with the textiles owing to lack of sustainability, biocompatibility, and portability, some practitioners develop a triboelectric nanogenerator device applied to the textile for providing power.

FIG. 1A shows a conventional triboelectric nanogenerator device 10. FIG. 1B shows a relation between an output voltage of the triboelectric nanogenerator device 10 of FIG. 1A and the humidity. The conventional triboelectric nanogenerator device 10 includes an upper substrate 12, a lower substrate 13 and a triboelectric nanogenerator structure 11. The triboelectric nanogenerator structure 11 includes an upper electrode layer 111, a lower triboelectric layer 112 and a lower electrode layer 113. The upper electrode layer 111 is electrically connected to the lower electrode layer 113, and the triboelectric nanogenerator structure 11 is disposed between the upper substrate 12 and the lower substrate 13. The upper electrode layer 111 and the lower electrode layer 113 are made of metal materials. The lower triboelectric layer 112 can be made of Polytetrafluoroethylene. At least one of the upper substrate 12 and the lower substrate 13 can be made of textile. Through operating the upper electrode layer 111 and the lower triboelectric layer 112 in a contact-separation mode, an output voltage can be generated to an electronic device. The structure is simplified and the usage is convenient.

However, the output voltage of the conventional triboelectric nanogenerator structure 11 is easily affected by the humidity, as shown in FIG. 1B, and the output voltage decreases when the humidity rises from 20% to 80%. As a result, when the triboelectric nanogenerator device 10 is applied to the wearable electronic device, the sweat or the circumstance humidity will affect the output voltage.

Based on the above-mentioned problems, how to effectively improve the triboelectric nanogenerator structure to increase the output stability thereof becomes a pursuit target for the practitioners.

SUMMARY

A triboelectric nanogenerator structure is provided. The triboelectric nanogenerator is composed of an upper electrode layer, a lower triboelectric layer, a lower electrode layer and an electric connecting member. The upper electrode layer is composed of a hybrid gel. The lower triboelectric layer corresponding to the upper electrode layer has a first surface and a second surface, and the first surface faces toward the upper electrode layer. The lower electrode layer is disposed at the second surface. The electric connecting member connects the upper electrode layer to the lower electrode layer.

Another triboelectric nanogenerator structure is provided. The triboelectric nanogenerator includes an upper electrode layer, a lower triboelectric layer, a lower electrode layer and an electric connecting member. The upper electrode layer is composed of a hybrid gel. The lower triboelectric layer corresponding to the upper electrode layer has a first surface and a second surface, and the first surface faces toward the upper electrode layer. The lower electrode layer is disposed at the second surface. The electric connecting member connects the upper electrode layer to the lower electrode layer. An output voltage of the triboelectric nanogenerator structure satisfies $0.9 \leq V1/V2 \leq 1$, where V1 represents the output voltage of the triboelectric nanogenerator structure at a relative humidity of 20%, and V2 represents the output voltage of the triboelectric nanogenerator structure at the relative humidity of 80%.

BRIEF DESCRIPTION OF THE DRAWINGS

The disclosure can be more fully understood by reading the following detailed description of the embodiments, with reference made to the accompanying drawings as follows:

FIG. 22A shows a system architecture of the disinfecting system of FIG. 19A.

FIG. 22B is a chart showing charging and discharging of the disinfecting system of FIG. 19A.

DETAILED DESCRIPTION

It will be understood that when an element (or mechanism or module) is referred to as be "disposed on", "connected to" or "coupled to" another element, it can be directly disposed on, connected or coupled to the other element, or it can be indirectly disposed on, connected or coupled to the other element, that is, intervening elements may be present. In contrast, when an element is referred to as be "directly disposed on," "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1B:
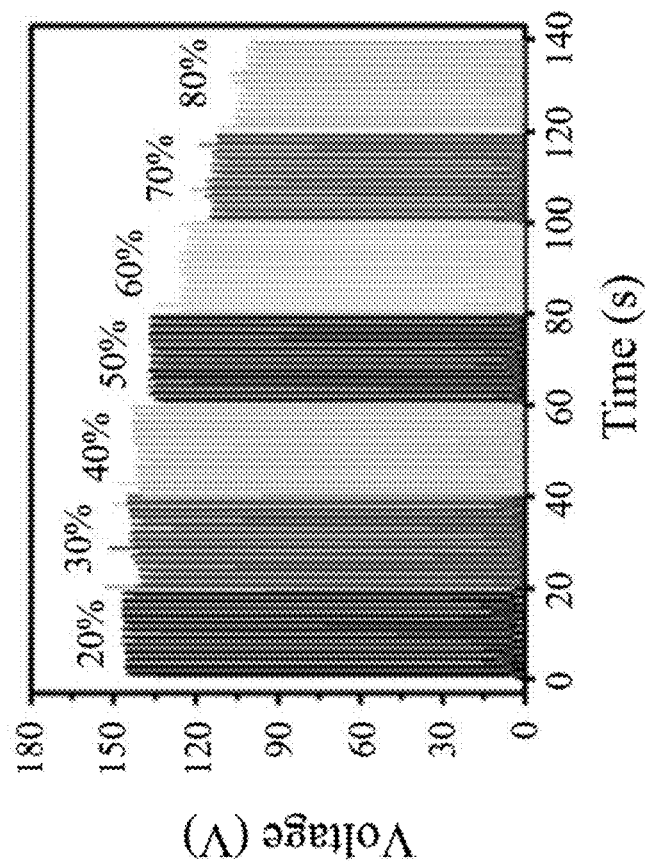
FIG. 1B shows a relation between an output voltage of the triboelectric nanogenerator device of FIG. 1A and the humidity.
Figure 1A:
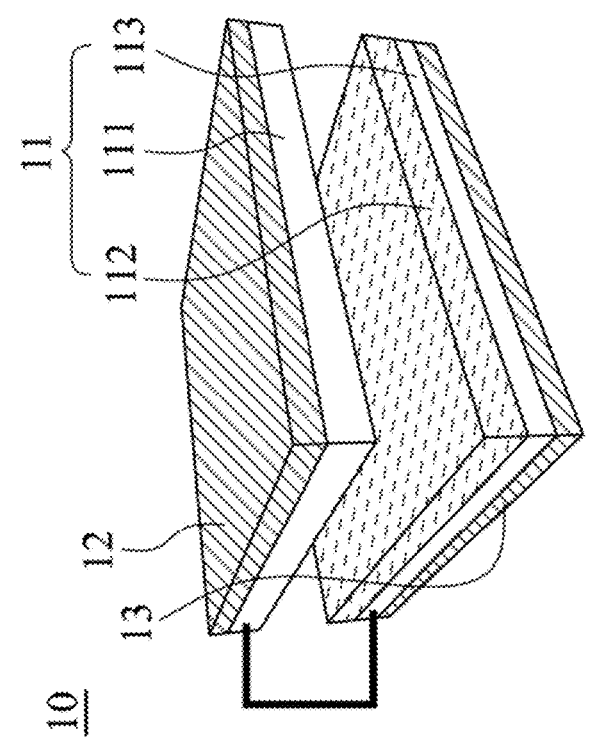
FIG. 1A shows a conventional triboelectric nanogenerator device.
Figure 2:
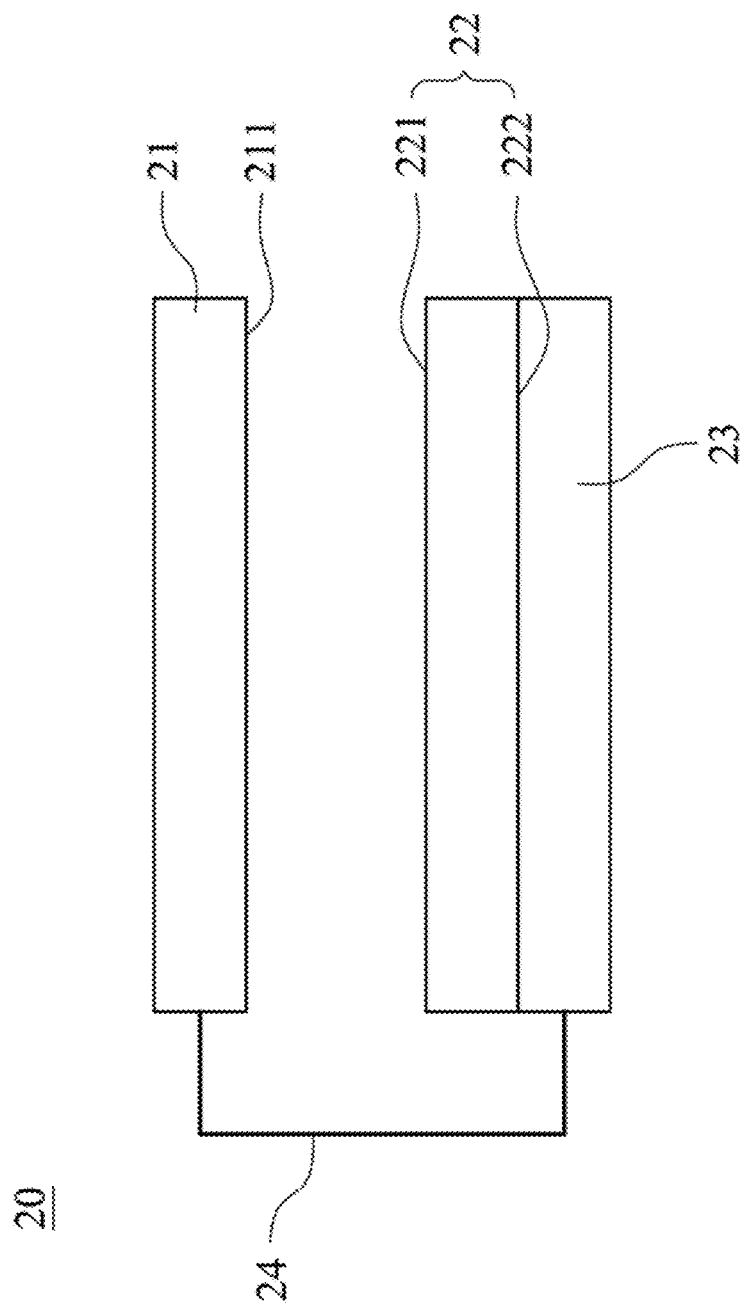
FIG. 2 shows a side view of the triboelectric nanogenerator structure according to a first embodiment of the present disclosure.

FIG. 2 shows a side view of the triboelectric nanogenerator structure 20 according to a first embodiment of the present disclosure. A triboelectric nanogenerator structure 20 includes an upper electrode layer 21, a lower triboelectric layer 22, a lower electrode layer 23 and an electric connecting member 24. The upper electrode layer 21 is composed of a hybrid gel. The lower triboelectric layer 22 corresponding to the upper electrode layer 21 has a first surface 221 and a second surface 222, and the first surface 221 faces toward the upper electrode layer 21. The lower electrode layer 23 is disposed at the second surface 222. The electric connecting member 24 connects the upper electrode layer 21 to the lower electrode layer 23.

Because the upper electrode layer 21 is composed of the hybrid gel, an output voltage generated by the triboelectric nanogenerator structure 20 will not easily be affected by the humidity, which results in high output stability. The details of triboelectric nanogenerator structure 20 will be described in the following paragraphs.

The upper electrode layer 21 is acted as both triboelectric and conductive materials. The upper electrode layer 21 has a triboelectric surface 211, and the triboelectric surface 211 is operated in a contact-separation mode with the lower triboelectric layer 22. In the present disclosure, the term contact-separation mode indicates that: move the triboelectric surface 211 toward the first surface 221 to contact the first surface 221, and then move the triboelectric surface 211 away from the first surface 221 to separate both, which are operated circularly to generate charges. Such a contact-separation mode is well known in the triboelectric nanogenerator filed, and the details will not be described.

The hybrid gel of the upper electrode layer 21 includes a chitosan and a glycerol. The glycerol is mixed with the chitosan. In fabrication, the acetic acid with 20 wt % chitosan can be mixed with different amount of glycerol. The mixed solution can be coated on a silicon substrate having nanostructured patterns. Then the coated silicon substrate was put into a vacuum chamber and pumped to remove residual bubbles in the mixed solution. Finally, the coated silicon substrate was heated at 60° C. for 4 hours to form the upper electrode layer 21 with nanostructures on the triboelectric surface 211. Each of the nanostructures can be a protrusion or a cave. In other embodiment, the hybrid gel can be made by mixing the chitosan with one or more materials, e.g. gelatin, starch, keratin or reduced graphene oxide, and the manufacturing process and parameters are not limited thereto. Please be noted that, when the upper electrode layer 21 has nanostructures on the triboelectric surface 211, a number of the output charges increases. In other embodiment, the nanostructures on the triboelectric surface can be a plurality of V-shaped grooves or U-shaped grooves spaced apart from each other, or the nanostructures can be omitted.

The lower triboelectric layer the 22 can be made of, but not limited to, Polytetrafluoroethylene (PTFE), and the lower electrode layer 23 can be made of, but not limited to, aluminum. The electric connecting member 24 can have a wire structure for connecting the upper electrode layer 21 to the lower electrode layer 23.

Figure 3B:
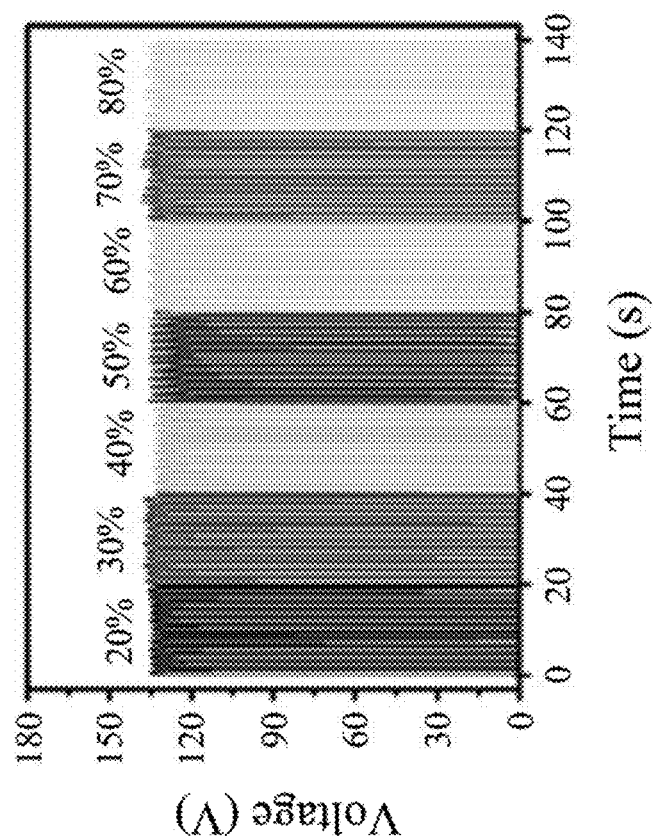
FIG. 3B shows a relation between the output voltage of the triboelectric nanogenerator structure of FIG. 2 and the humidity.
Figure 3A:
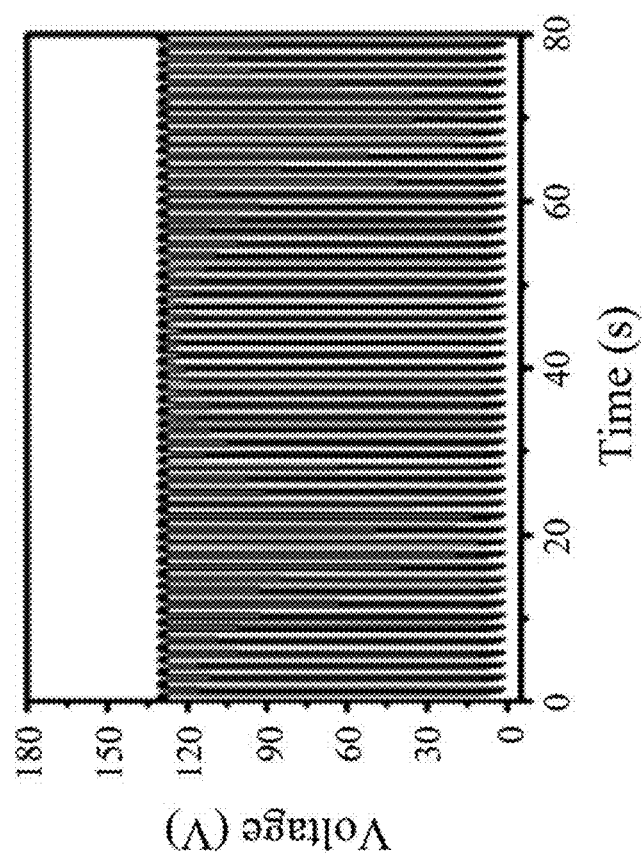
FIG. 3A shows a relation between an output voltage of the triboelectric nanogenerator structure of FIG. 2 and the time.

FIG. 3A shows a relation between an output voltage of the triboelectric nanogenerator structure 20 of FIG. 2 and the time. As shown in FIG. 3A, the output voltage of the triboelectric nanogenerator structure 20 is stable even when the time passes. Therefore, the triboelectric nanogenerator structure 20 has high output stability.

FIG. 3B shows a relation between the output voltage of the triboelectric nanogenerator structure 20 of FIG. 2 and the humidity. The output voltages are measured at 20%, 30%, 40%, 50%, 60%, 70% and 80% humidity, respectively, and the term "humidity" referred in the disclosure indicates the relative humidity. As shown in FIG. 38, the output voltage of the triboelectric nanogenerator structure 20 is stable at different humidity. Hence, the triboelectric nanogenerator structure 20 has high output stability. Preferably, the output voltage of the triboelectric nanogenerator structure 20 satisfies $0.9 \leq V1/V2 \leq 1$, where V1 represents the output voltage of the triboelectric nanogenerator structure 20 at 20% humidity, and V2 represents the output voltage of the triboelectric nanogenerator structure 20 at 80% humidity. Preferably, the output voltage of the triboelectric nanogenerator structure 20 satisfies $0.95 \leq V1/V2 \geq 1$.

Figure 4:
FIG. 4 shows a relation between the output voltage of the triboelectric nanogenerator structure of FIG. 2 and a number of contacts in a contact-separation mode.

FIG. 4 shows a relation between the output voltage of the triboelectric nanogenerator structure 20 of FIG. 2 and a number of contacts in a contact-separation mode. In FIG. 4, a linear motor is used to bring the upper electrode layer 21 into contact with and separated from the lower triboelectric layer 22 at a contact frequency of 1 Hz for 3 hours, and the 12,000 to 13,000 times contacts are operated in high humidity. As shown in FIG. 4, after 10,000 times contacts, the output voltage is still stable and will not be affected by the humidity. Hence, the triboelectric nanogenerator structure 20 has high output stability.

Figure 5:
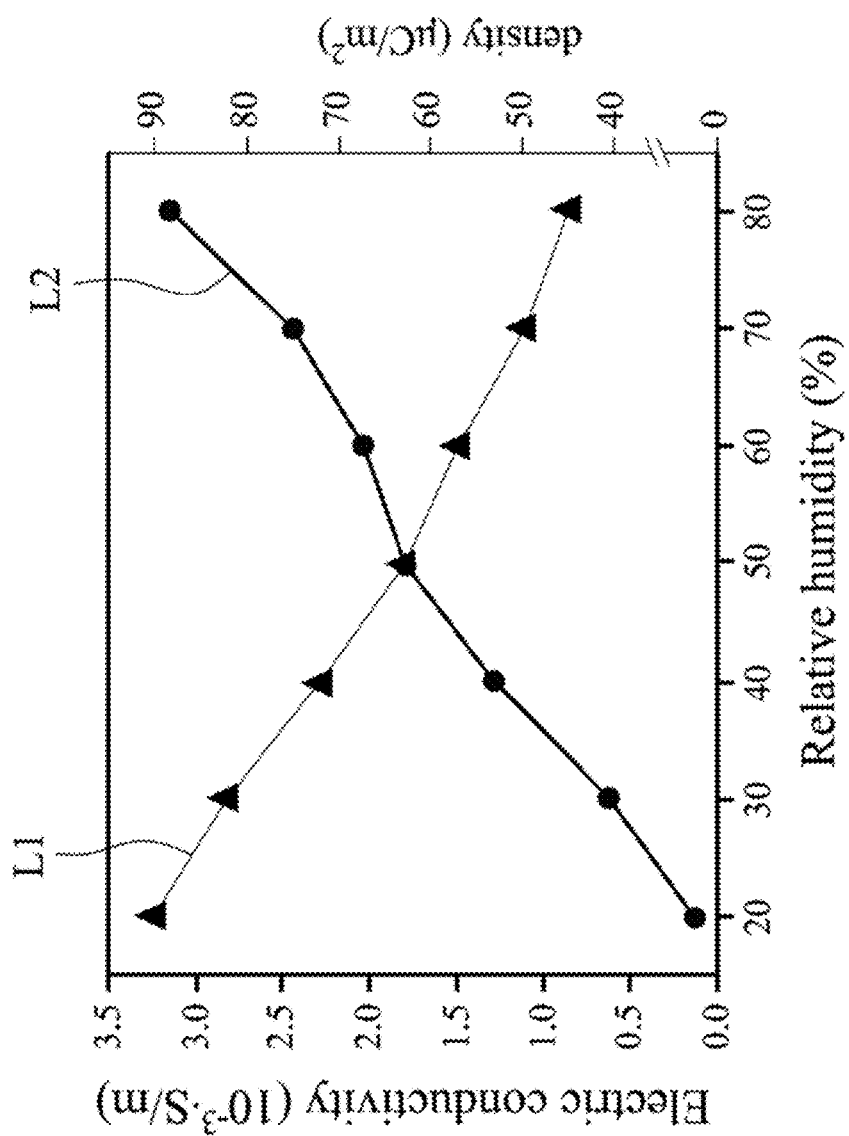
FIG. 5 shows a relation between a conductivity of an upper electrode layer of the triboelectric nanogenerator structure of FIG. 2 and the humidity, and a relation between a charge density of a comparison triboelectric nanogenerator structure and the humidity.

FIG. 5 shows a relation between a conductivity of an upper electrode layer 21 of the triboelectric nanogenerator structure 20 of FIG. 2 and the humidity, and a relation between a charge density of a comparison triboelectric nanogenerator structure and the humidity. The comparison triboelectric nanogenerator structure has an upper electrode layer, an upper triboelectric layer, a lower triboelectric layer and a lower electrode layer. The upper electrode layer of the comparison triboelectric nanogenerator structure is made of aluminum. The upper triboelectric layer of the comparison triboelectric nanogenerator structure is made of a hybrid gel which is identical to the upper electrode layer 21 of the triboelectric nanogenerator structure 20. In addition, the materials of the lower triboelectric layer and the lower electrode layer of the comparison triboelectric nanogenerator structure are identical to the lower triboelectric layer 22 and the lower electrode layer 23 of the triboelectric nanogenerator structure 20, respectively. In other words, the hybrid gel of the triboelectric nanogenerator structure 20 is acted as both triboelectric and conductive materials while the hybrid gel of the comparison triboelectric nanogenerator structure is only acted as the triboelectric material. As shown in FIG. 5, the charge density of the upper triboelectric layer (hybrid gel) of the comparison triboelectric nanogenerator structure indicated by line L1 decreases when the humidity increases. On the other hand, the conductivity of the upper electrode layer 21 (hybrid gel) of the triboelectric nanogenerator structure 20 indicated by line L2 increases when the humidity increases. Additionally, the resistance of the upper electrode layer 21 of the triboelectric nanogenerator structure 20 will decrease when the humidity increases. Consequently, the output voltage of upper electrode layer 21 of the triboelectric nanogenerator structure 20, which is made of the hybrid gel, is stable owing to the property that the charge density decreases while the humidity increases when the hybrid gel is acted as the triboelectric material, and the conductivity increases while the humidity increases when the hybrid gel is acted as both the triboelectric material and the electrode material.

Figure 6:
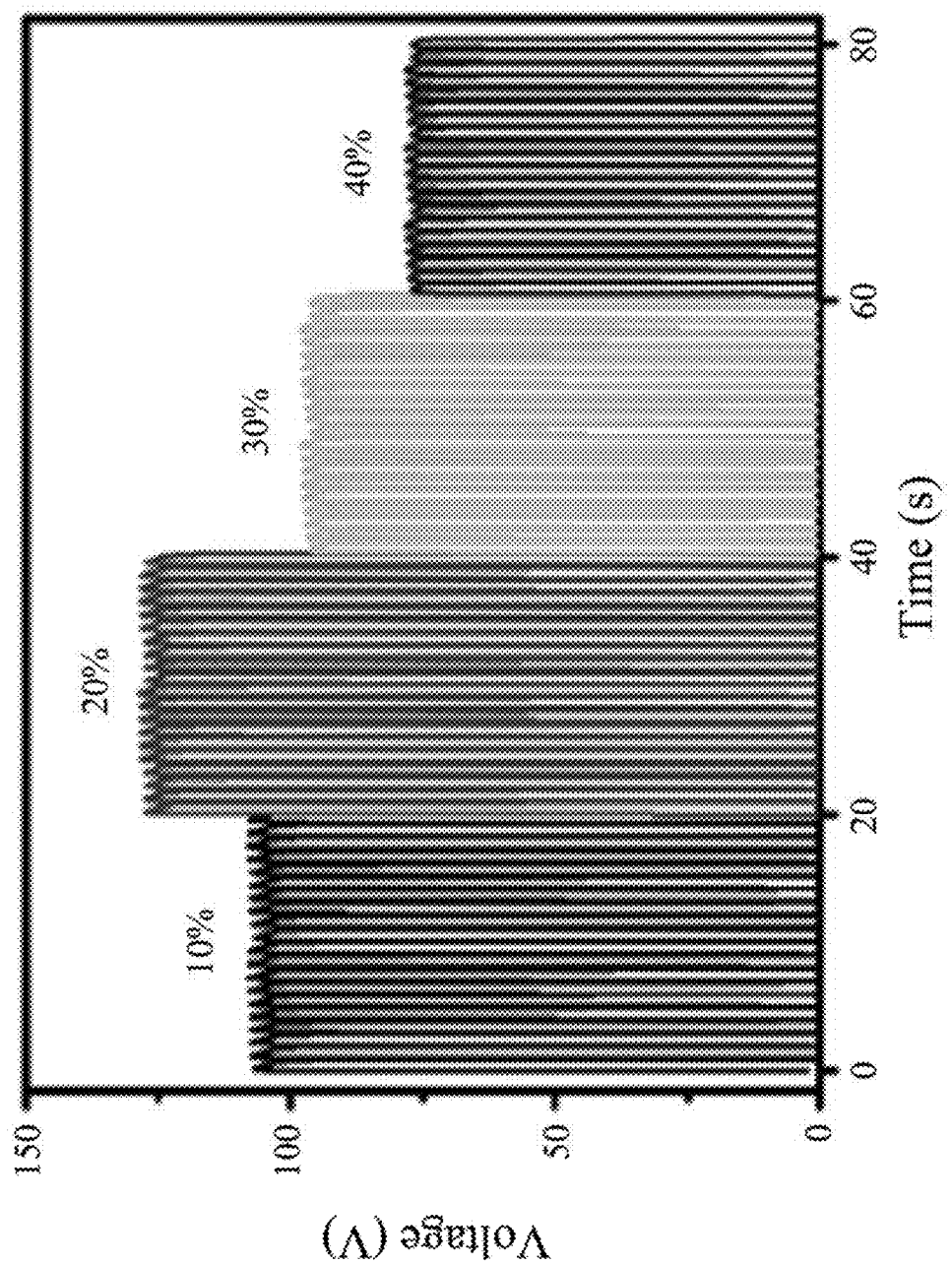
FIG. 6 shows a relation between a concentration of a glycerol of the upper electrode layer of FIG. 2 and the output voltage.

FIG. 6 shows a relation between a concentration of a glycerol of the upper electrode layer 21 of FIG. 2 and the output voltage. In fabrication, different amount of glycerol is added into the acetic acid with 20 wt % chitosan. Solutions containing 10 wt %, 20 wt %, 30 wt % and 40 wt % glycerol are formed. As shown in FIG. 6, when the glycerol is 20 wt %, the triboelectric nanogenerator structure 20 has a highest output voltage. Preferably, a concentration of the glycerol is within a range of 15 wt % to 25 wt %.

Figure 7:
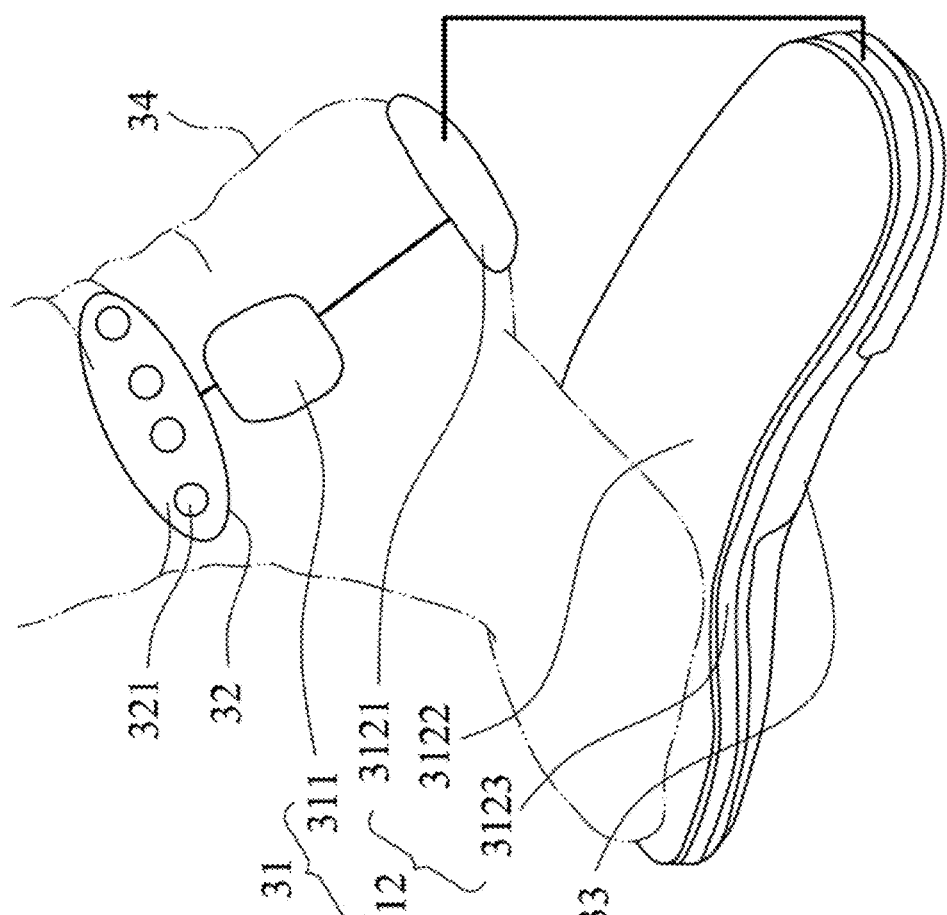
FIG. 7 shows a schematic view of a sensing system according to a second embodiment of the present disclosure.
Figure 8:
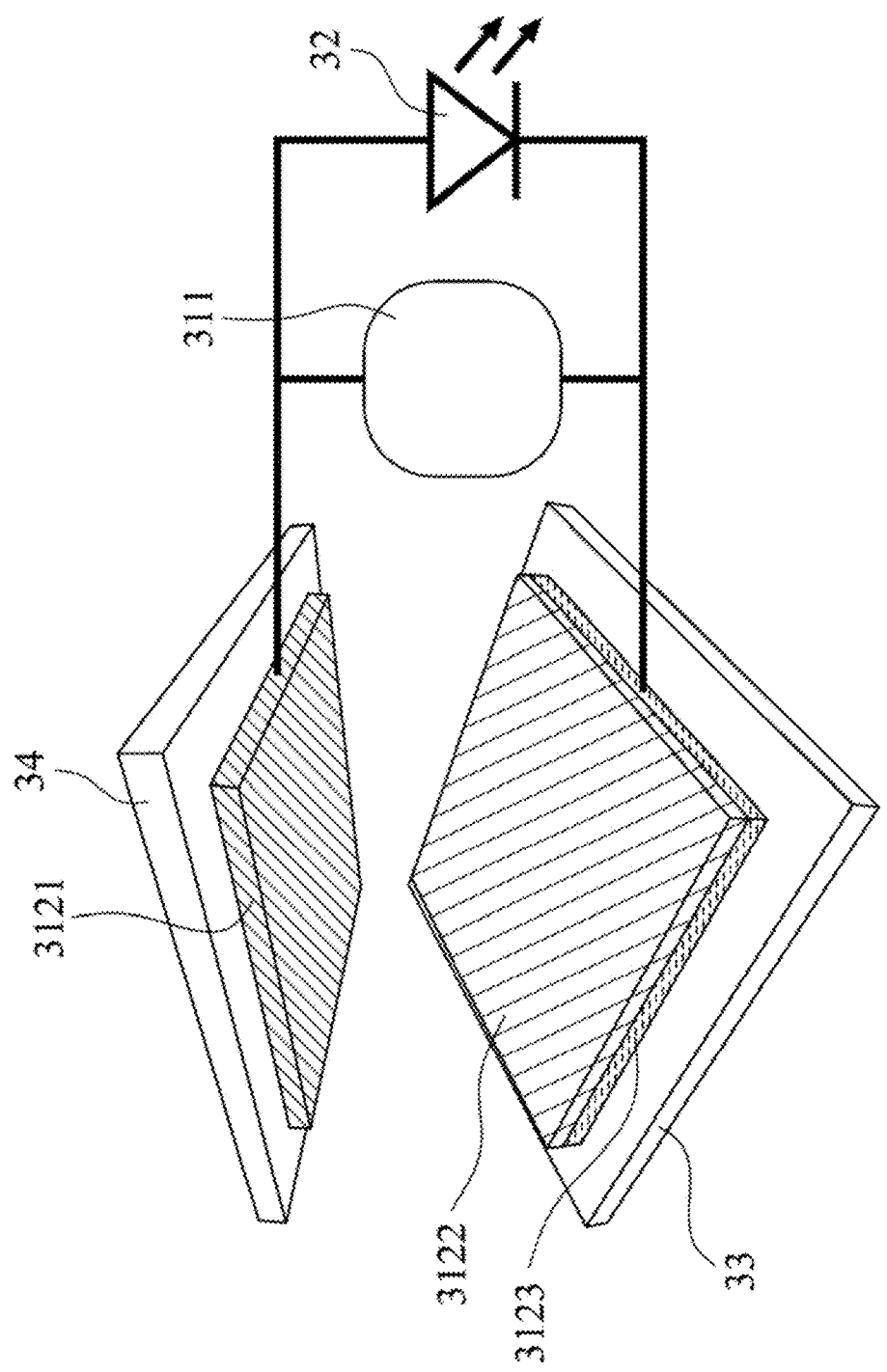
FIG. 8 shows a simplified view of the sensing system of FIG. 7.
Figure 9:
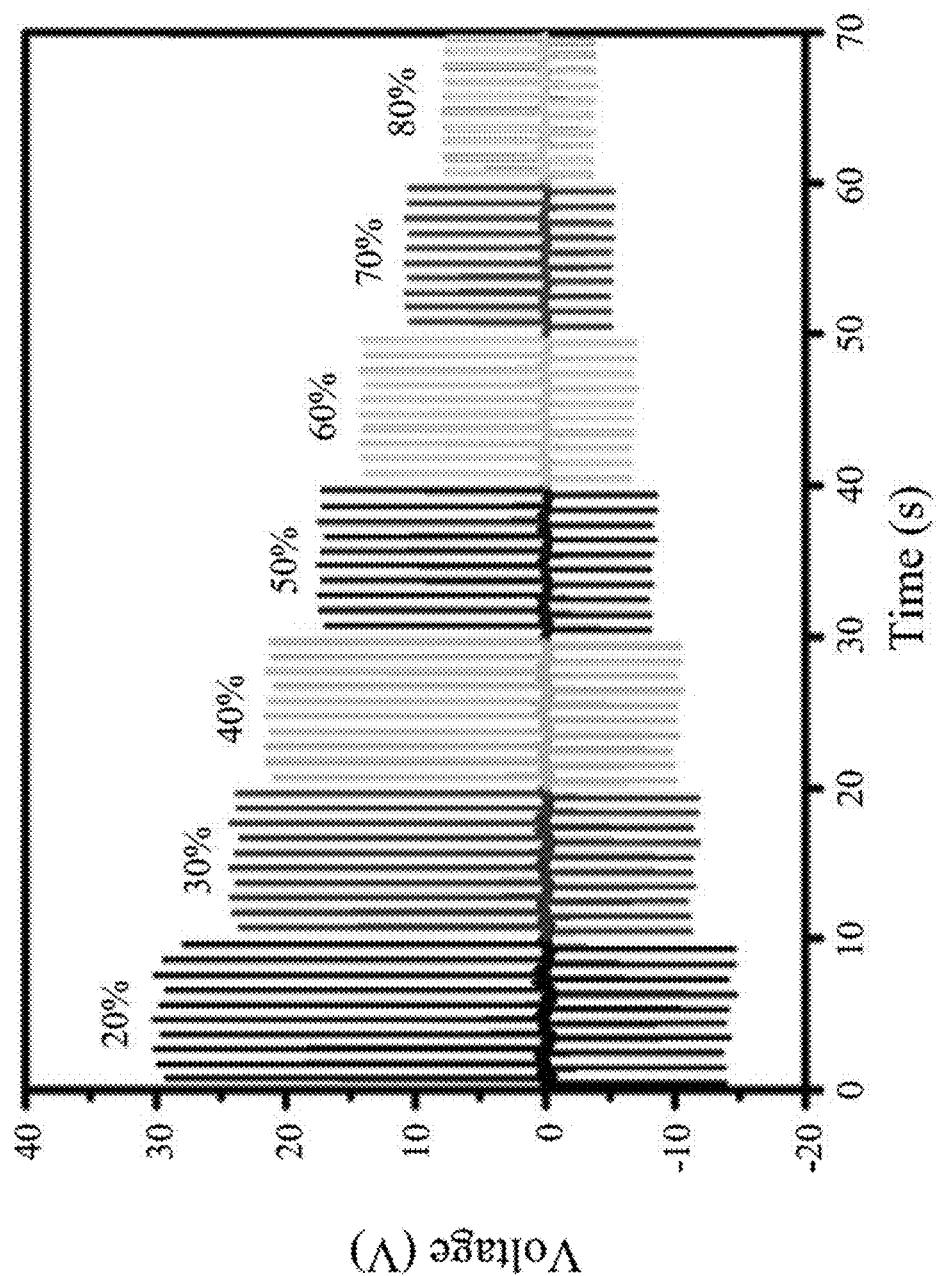
FIG. 9 shows a sensing result of the sensing system of FIG. 7.

FIG. 7 shows a schematic view of a sensing system 30 according to a second embodiment of the present disclosure. FIG. 8 shows a simplified view of the sensing system 30 of FIG. 7. FIG. 9 shows a sensing result of the sensing system 30 of FIG. 7. The sensing system 30 includes a humidity sensing module 31 and a display module 32. The humidity sensing module 31 includes a humidity sensor 311 and a power source (not labeled). The power source includes a triboelectric nanogenerator structure 312, and the electric connecting member (not labeled) is connected to the humidity sensor 311. The display module 32 is electrically connected to the humidity sensing module 31.

To be more specific, the sensing system 30 further includes a wearable member 34 and a disposing member 33, and the disposing member 33 corresponds to the wearable member 34. The upper electrode layer 3121 is disposed at the wearable member 34 and is exposed therefrom. The lower electrode layer 3123 is disposed between the disposing member 33 and the lower triboelectric layer 3122.

The structures and materials of the upper electrode layer 3121, the lower triboelectric layer 3122 and the lower electrode layer 3123 of the triboelectric nanogenerator structure 312 are identical to that of the upper electrode layer 21, the lower triboelectric layer 22 and the lower electrode layer 23 of the triboelectric nanogenerator structure 20, and the details will not be described. The wearable member 34 in the second embodiment has a sock structure, and the upper electrode layer 3121 is coated on an outside of the wearable member 34 so as to expose therefrom. The disposing member 33 has an insole structure, and the lower electrode layer 3123 is covered on a surface of the disposing member 33, which corresponds to the wearable member 34. The lower triboelectric layer 3122 is disposed upon the lower electrode layer 3123. The disposing member 33 can be disposed within a shoe (not shown). In addition, the humidity sensor 311 can be disposed on the wearable member 34.

When the wearable member 34 worn by a foot of a user (not shown) is disposed within the shoe, the wearable member 34 will correspond to the disposing member 33, ad when the user walks, the wearable member 34 will continuously contact and separate from the disposing member 33 such that the upper electrode layer 3121 and the lower triboelectric layer 3122 are operated in the contact-separation mode to generate voltage.

In the second embodiment, the humidity sensor 311 can be a hygristor. As shown in FIG. 8, the upper electrode layer 3121, the humidity sensor 311 and the lower electrode layer 3123 are connected in serial, and the humidity sensor 311 and the display module 32 are connected in parallel. As shown in FIG. 9, because the resistance of the humidity sensor 311 will rise while the humidity rises, the output voltage of the triboelectric nanogenerator structure 312 will decrease while the humidity increases.

The display module 32 can include four LEDs 321 electrically connected to the humidity sensing module 31. When the humidity sensor 311 senses the change of the humidity inside the shoe, the light statuses of the four LEDs 321 will be changed to show the humidity inside the shoe to the user. For example, when the humidity is under 20%, the output voltage of the triboelectric generator structure 312 is high, and the four LEDs 321 are turned on. When the humidity is 40%, three LEDs 321 are turned on. When the humidity is 80%, the output voltage of the triboelectric generator structure 312 is low, and only one LED 321 is turned on. In other embodiment, the display module can include only one LED, and the lightness of the LED corresponds the humidity inside the shoe. The display module can include, but not be limited to, an LCD for showing the values of the humidity.

Figure 10B:
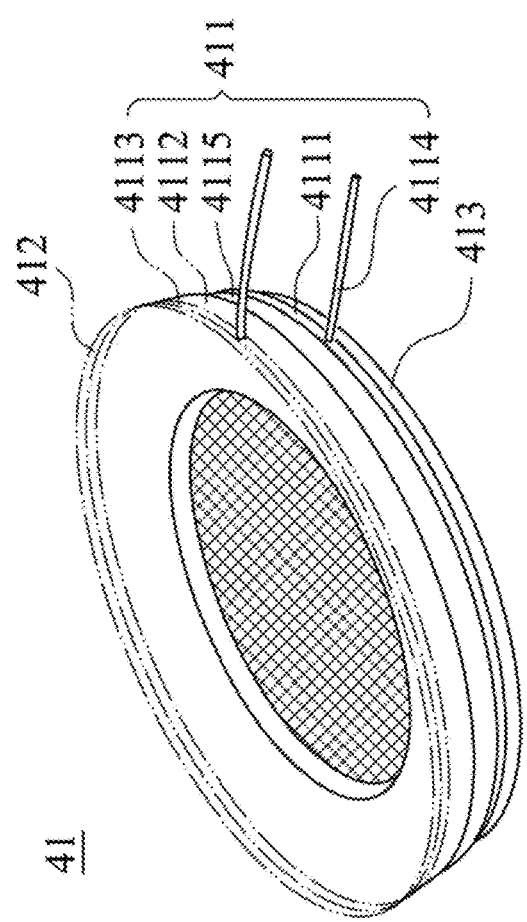
FIG. 10B shows a schematic view of a sensor of the sensing system of FIG. 10A.
Figure 10A:
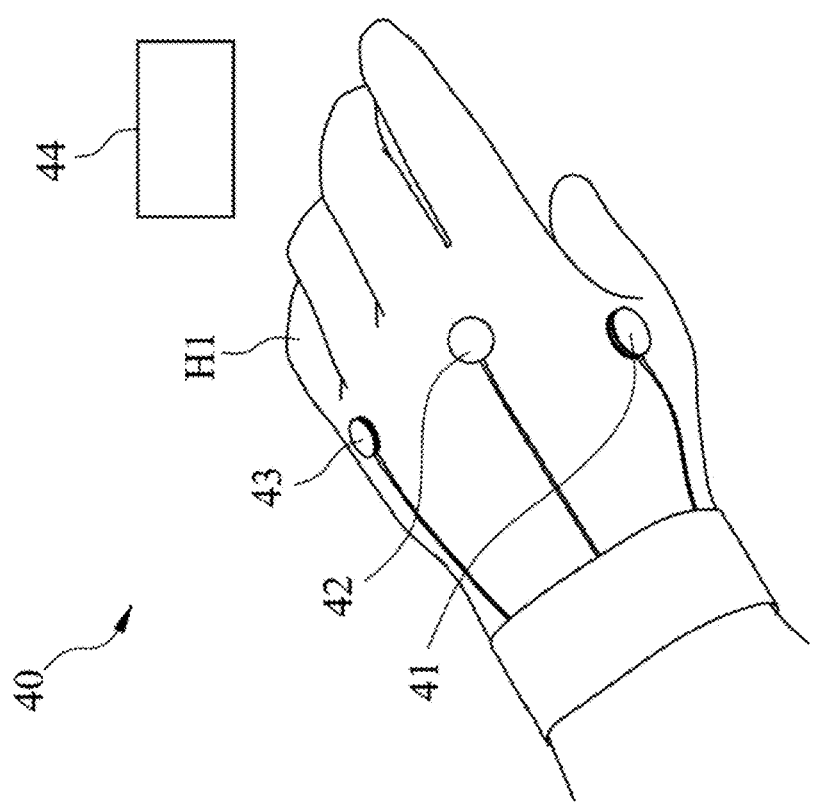
FIG. 10A shows a schematic view of a sensing system according to a third embodiment of the present disclosure applied to an article.
Figure 11:
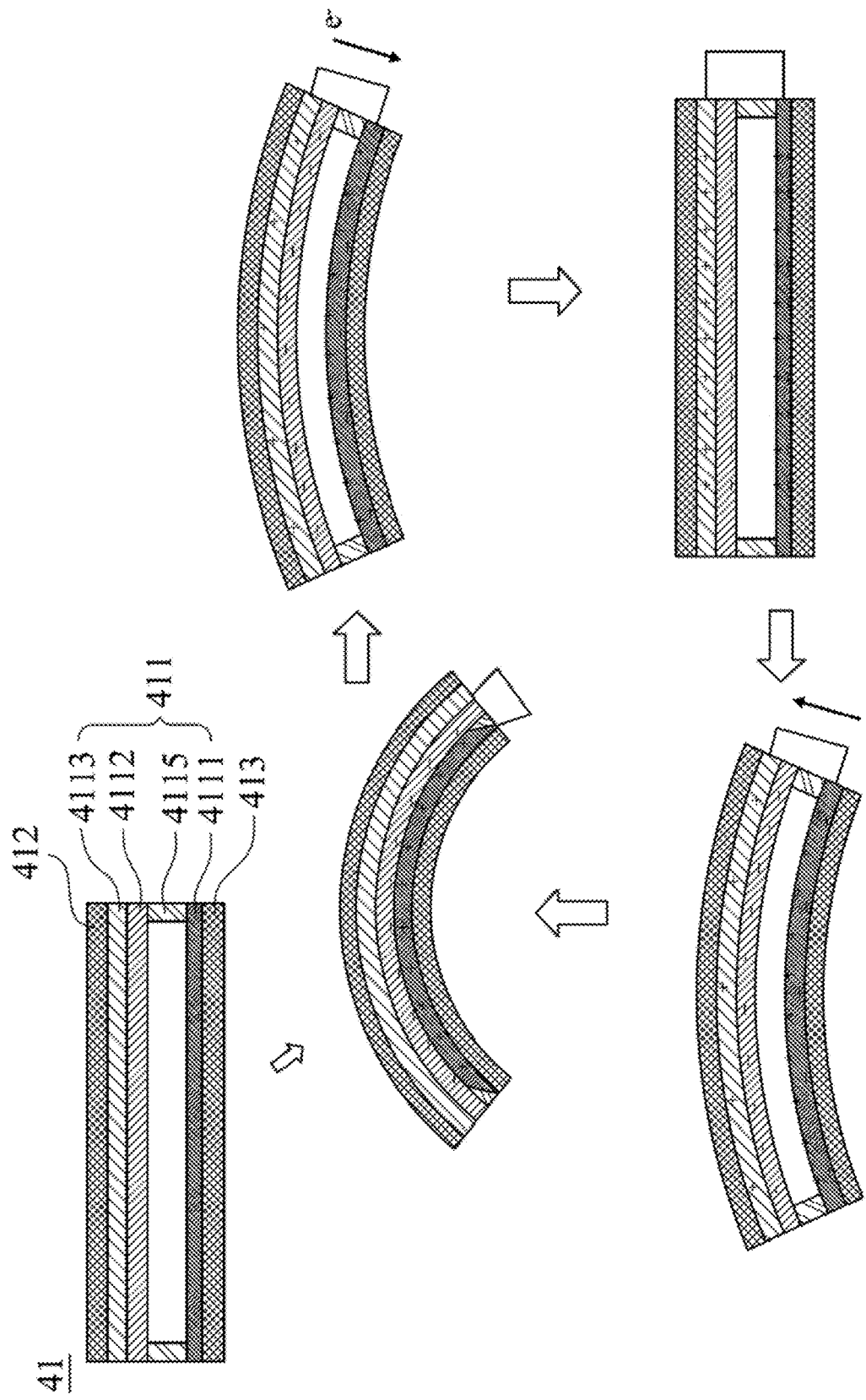
FIG. 11 shows an operation of the sensor of FIG. 10B.

FIG. 10A shows a schematic view of a sensing system 40 according to a third embodiment of the present disclosure applied to an article H1. FIG. 10B shows a schematic view of a sensor 41 of the sensing system 40 of FIG. 10A. FIG. 11 shows an operation of the sensor 41 of FIG. 10B. The sensing system 40 includes a sensing module (not labeled) and a display module 44. The sensing module includes a plurality of sensors 41, 42, 43. Each of the sensors 41, 42, 43 contacts each of a plurality of portions of an article H1, and each of the sensors 41, 42, 43 includes a triboelectric nanogenerator structure 411 (because each of the sensors 41, 42, 43 has the same structure, only the triboelectric nanogenerator structure 411 of the sensor 41 is shown in FIG. 10B, and when referring to the triboelectric nanogenerator structure 411 of the third embodiment, the triboelectric nanogenerator structure 411 of the sensor 41 will be mentioned as an illustration). The display module 44 is electrically connected to the sensing module. Output voltages of the sensors 41, 42, 43 are changeable according to motions of the portions of the article H1.

In the third embodiment, the article H1 is illustrated as a hand. The sensors 41, 42 43 are disposed on the back of the hand. The sensor 41 includes the triboelectric nanogenerator structure 411, the upper substrate 413 and a lower substrate 412. The triboelectric nanogenerator structure 411 is similar to the triboelectric nanogenerator structure 20 of the first embodiment and includes an upper electrode layer 4111, a lower triboelectric layer 4112, a lower electrode layer 4113 and an electric connecting member 4114, but the materials of the lower triboelectric layer 4112 and the lower electrode layer 4113 are different from that of the first embodiment. The lower triboelectric layer 4112 is made of Fluorinated ethylene propylene (FEP), and the lower electrode layer 4113 is made of indium tin oxide (ITO). The upper electrode layer 4111 is disposed at the upper substrate 413, and the lower electrode layer 4113 is disposed at the lower substrate 412. Both of the upper substrate 413 and the lower substrate 412 are made of polydimethylsiloxane (PDMS).

The triboelectric nanogenerator structure 411 can further include a hollow spacer 4115 disposed between the upper electrode layer 4111 and the lower triboelectric layer 4112. When the triboelectric nanogenerator structure 411 is forced, the hollow spacer 4115 is deformed such that the upper electrode layer 4111 contacts the lower triboelectric layer 4112.

The hollow spacer 4115 has a ring structure. The hollow spacer 4115 has an elasticity and can be deformed when being forced. Accordingly, in one status, a hole of the hollow spacer 4115 forms a gap between the upper electrode layer 4111 and the lower triboelectric layer 4112 such that the upper electrode layer 4111 and the lower triboelectric layer 4112 is separated. On the other hand, in another status, the hollow spacer 4115 is deformed to allow the upper electrode layer 4111 to contact the lower triboelectric layer 4112. As shown in FIG. 11, initially, the triboelectric nanogenerator structure 411 is not forced, and the upper electrode layer 4111 dose not contact the lower triboelectric layer 4112. After the triboelectric nanogenerator structure 411 is forced and deformed, the upper electrode layer 4111 contacts the lower triboelectric layer 4112 to generate charges. Moreover, after removal of the force, the upper electrode layer 4111 is separated from the lower triboelectric layer 4112 to allow the electron e⁻ to flow from the lower electrode layer 4113 toward the upper electrode layer 4111. The triboelectric nanogenerator structure 411 can be forced to change the electric potential energy such that the electron e⁻ will be allowed to flow from the upper electrode layer 4111 toward the lower electrode layer 4113.

Through operating the triboelectric nanogenerator structure 411 in the contact-separation mode, the triboelectric nanogenerator structure 411 can generate the output voltage which can be detected and be served as a base of the judgement.

Figure 12:
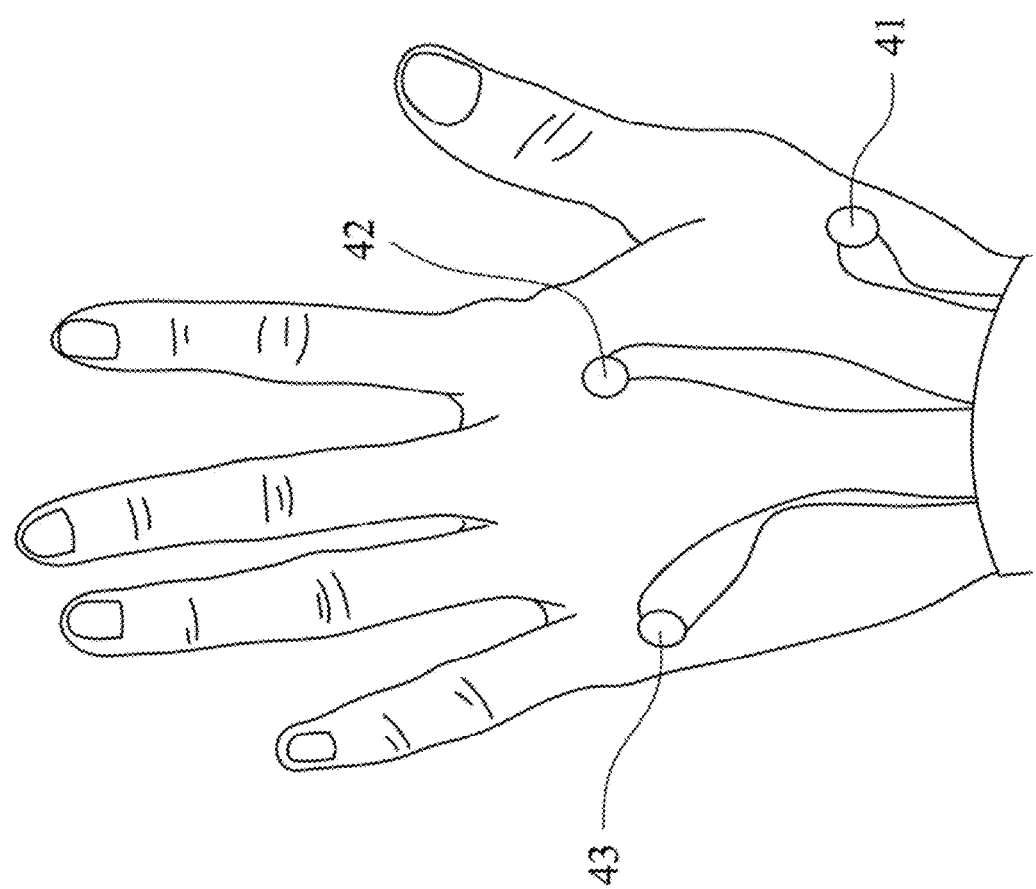
FIG. 12 shows a distribution of the sensors on a hand.
Figure 16A:
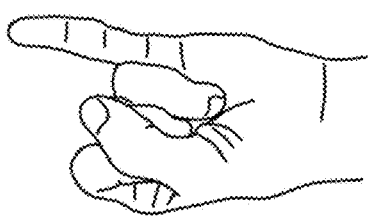
FIG. 16A shows a fourth motion of the hand.
Figure 16B:
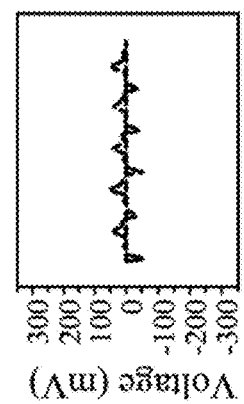
FIG. 16B shows the output voltage of the sensor of FIG. 16A.
Figure 15A:
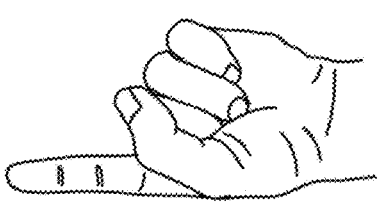
FIG. 15A shows a third motion of the hand.
Figure 15B:
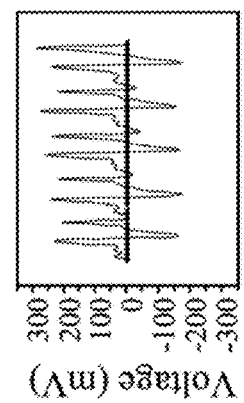
FIG. 15B shows the output voltage of the sensor of FIG. 15A.
Figure 14A:
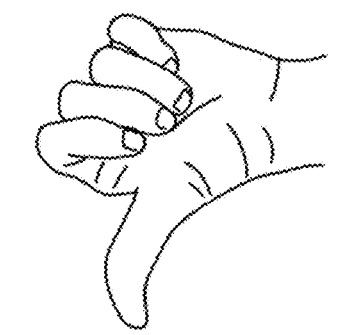
FIG. 14A shows a second motion of the hand.
Figure 14B:
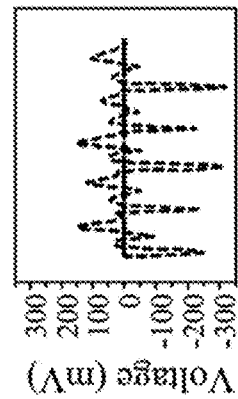
FIG. 14B shows the output voltage of the sensor of FIG. 14A.
Figure 13A:
FIG. 13A shows a first motion of the hand.
Figure 13B:
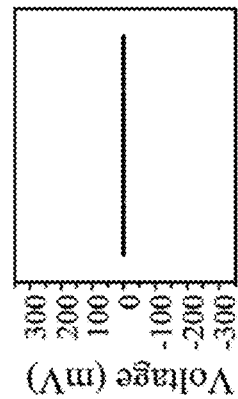
FIG. 13B shows an output voltage of the sensor of FIG. 13A.

FIG. 12 shows a distribution of the sensors 41, 42, 43 on the hand. FIG. 13A shows a first motion of the hand. FIG. 13B shows output voltages of the sensors 41, 42, 43 of FIG. 13A. FIG. 14A shows a second motion of the hand. FIG. 14B shows the output voltage of the sensor 41 of FIG. 14A. FIG. 15A shows a third motion of the hand. FIG. 15B shows the output voltage of the sensor 42 of FIG. 15A. FIG. 16A shows a fourth motion of the hand. FIG. 16B shows the output voltage of the sensors 43 of FIG. 16A. As shown in FIG. 12, the sensor 41 is disposed on the back of the hand and corresponds to the thumb. The sensor 42 is disposed on the back of the hand and corresponds to the index finger. The sensor 43 is disposed on the back of the hand and corresponds to the little finger. In other embodiment, the sensors are not limited to be arranged to correspond to the thumb, the index finger or the little finger.

As shown in FIGS. 13A and 13B, the initial status is a clenched first state, since the sensors 41, 42, 43 are not forced, and the output voltages of the sensors 41, 42, 43 are zero. As shown in FIGS. 14A and 14B, since movement of the thumb causes deformation of the skin, the sensor 41 is forced and generates the output voltage. As shown in FIGS. 15A and 15B, since movement of the index finger causes deformation of the skin, the sensor 42 is forced and generates the output voltage. As shown in FIGS. 16A and 16B, since movement of the little finger causes deformation of the skin, the sensor 43 is forced and generates the output voltage.

Hence, the movements of the fingers can be detected by detecting the output voltages of the sensors 41, 42, 43. In other embodiment, three sensors are placed on the back of the right hand, and another three sensors are placed on the back of the left hand. Based on the configuration, the combinations of detecting results increase, and 26 English alphabets can be presented by different combinations. Therefore, English alphabet can be identified by analyzing the output voltages of the sensors 41, 42, 43, and English alphabet can be shown by the display module 44.

Figure 17B:
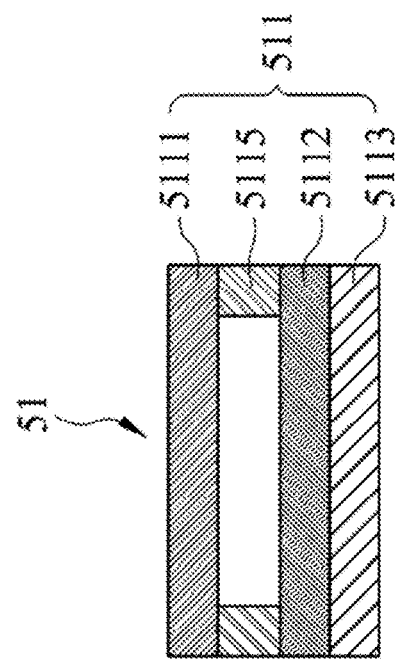
FIG. 17B shows a cross-sectional view of a sensor of the sensing system of FIG. 17A.
Figure 17A:
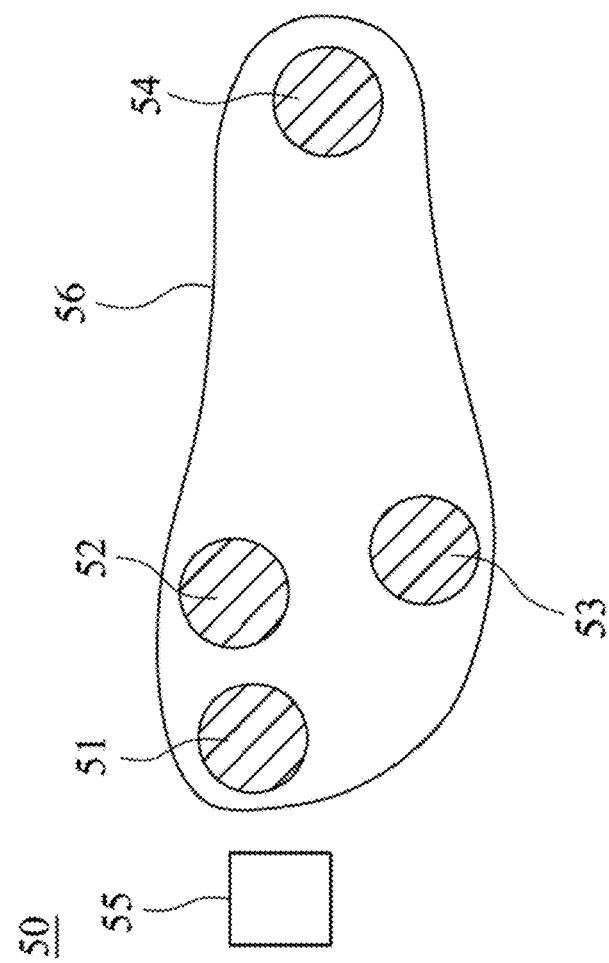
FIG. 17A shows a schematic view of a sensing system according to a fourth embodiment of the present disclosure.

FIG. 17A shows a schematic view of a sensing system 50 according to a fourth embodiment of the present disclosure. FIG. 17B shows a cross-sectional view of a sensor 51 of the sensing system 50 of FIG. 17A. The sensing system 50 includes a sensing module (not labeled) and a display module 55. The sensing module includes a plurality of sensors 51, 52, 53, 54. Each of the sensors 51, 52, 53, 54 contacts each of a plurality of portions of an article (not shown), and each of the sensors 51, 52, 53, 54 includes a triboelectric nanogenerator structure 511 (because each of the sensors 51, 52, 53, 54 has the same structure, only the triboelectric nanogenerator structure 511 of the sensor 51 is shown in FIG. 17B, and when referring to the triboelectric nanogenerator structure 511 of the fourth embodiment, the triboelectric nanogenerator structure 511 of the sensor 51 will be mentioned as an illustration). The display module 55 is electrically connected to the sensing module. Output voltages of the sensors 51, 52, 53, 54 are changeable according to motions of the portions of the article.

Precisely, the triboelectric nanogenerator structure 511 is similar to the triboelectric nanogenerator structure 411 of the third embodiment, and includes an upper electrode layer 5111, a lower triboelectric layer 5112, a lower electrode layer 5113 and a hollow spacer 5115. The materials of the lower triboelectric layer 5112 and the lower electrode layer 5113 are different from that of the third embodiment but are the same as the first embodiment.

In the fourth embodiment, the sensing system 50 can further include a disposing member 56 corresponding to the article. Each of the lower electrode layers 5113 are disposed at the disposing member 56. The article contacts the sensors 51, 52, 53, 54 such that the sensors 51, 52, 53, 54 generate the output voltage.

The article may be a foot, and the disposing member 56 can have an insole structure. The sensors 51, 52, 53, 54 are disposed at different locations of the disposing member 56. Accordingly, when the foot is stepping on the disposing member 56, different portion of the foot will contact different sensors 51, 52, 53, 54. Since the pressure on the sensors 51, 52, 53, 54 caused by the different portion of the foot are different, the output voltages thereof are different. In other embodiment, the lower triboelectric layer and the lower electrode layer can cover whole upper surface of the disposing member. The sensing system can further include a wearable member where the upper electrode layer is disposed, and the wearable member may be worn on the article. In one embodiment, the wearable member can have a sock structure, and a plurality of upper electrode layer are disposed at different locations of the wearable member. Through the movement of the foot, the upper electrode layer and the lower triboelectric layer can be operated in the contact-separation mode.

Figure 18:
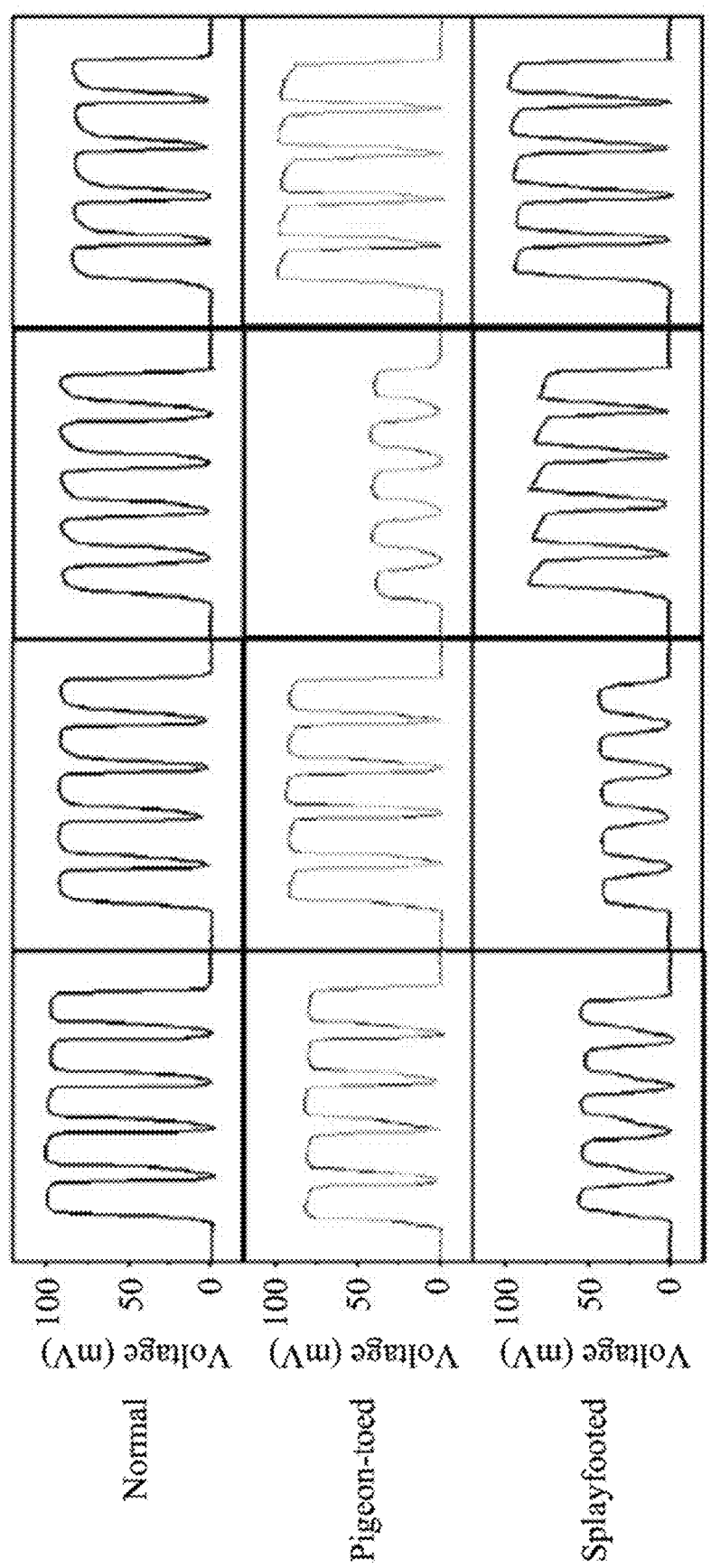
FIG. 18 shows a measurement of the sensing system of FIG. 17A.

FIG. 18 shows a measurement of the sensing system 50 of FIG. 17A, and the output voltages of the sensors 51, 52, 53, 54 are indicated from the left side to the right side of FIG. 18. As shown in FIG. 18, the output voltages of the sensors 51, 52, 53, 54 are different owing to different pressure caused by different portion of the foot. Hence, through analyzing the output voltage, different walking positions such as normal position, pigeon-toed position, and splay-footed position, can be detected for further treatment. In addition, other abnormal positions which can be detected by the foot pressure can be detected, and the present disclosure is not limited thereto.

Figure 19:
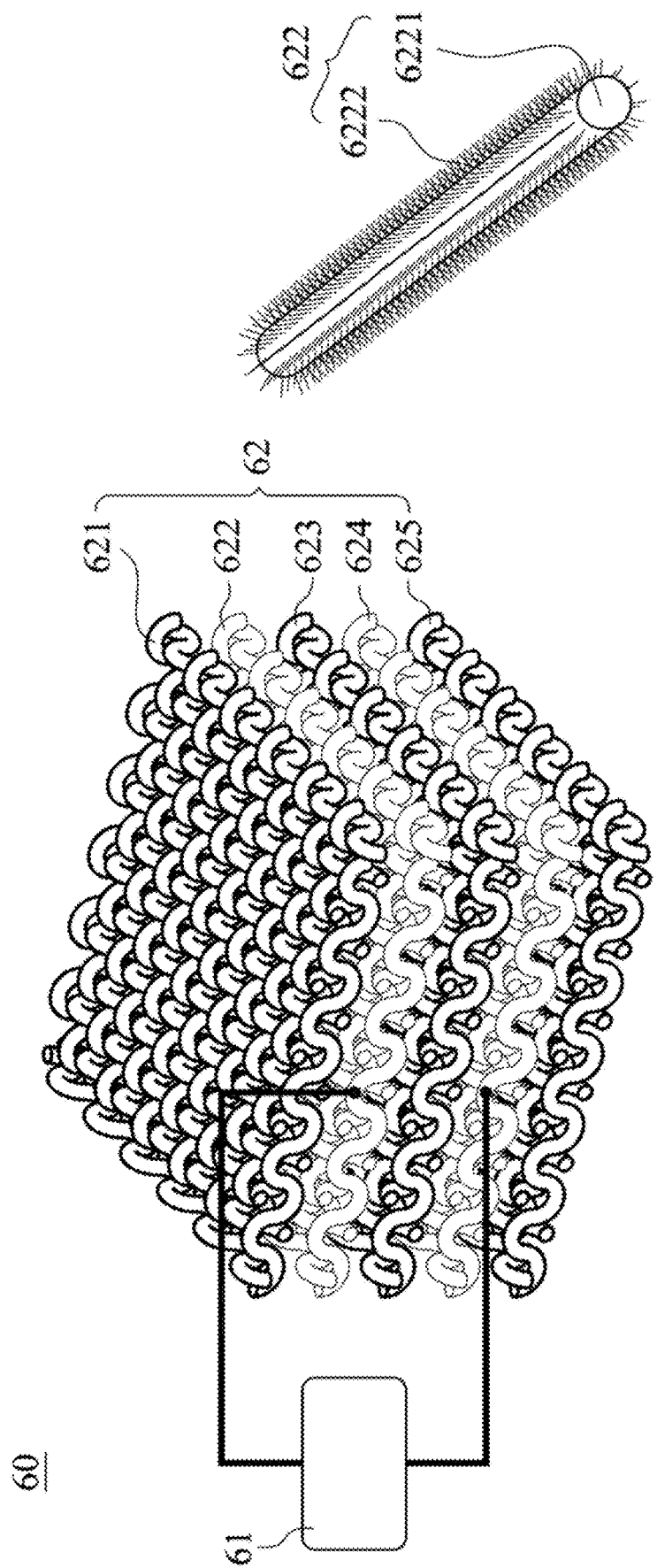
FIG. 19A shows a schematic view of a disinfecting system according to a fifth embodiment of the present disclosure.
FIG. 19B shows a schematic view of a disinfecting layer of the disinfecting system of FIG. 19A.
Figure 20:
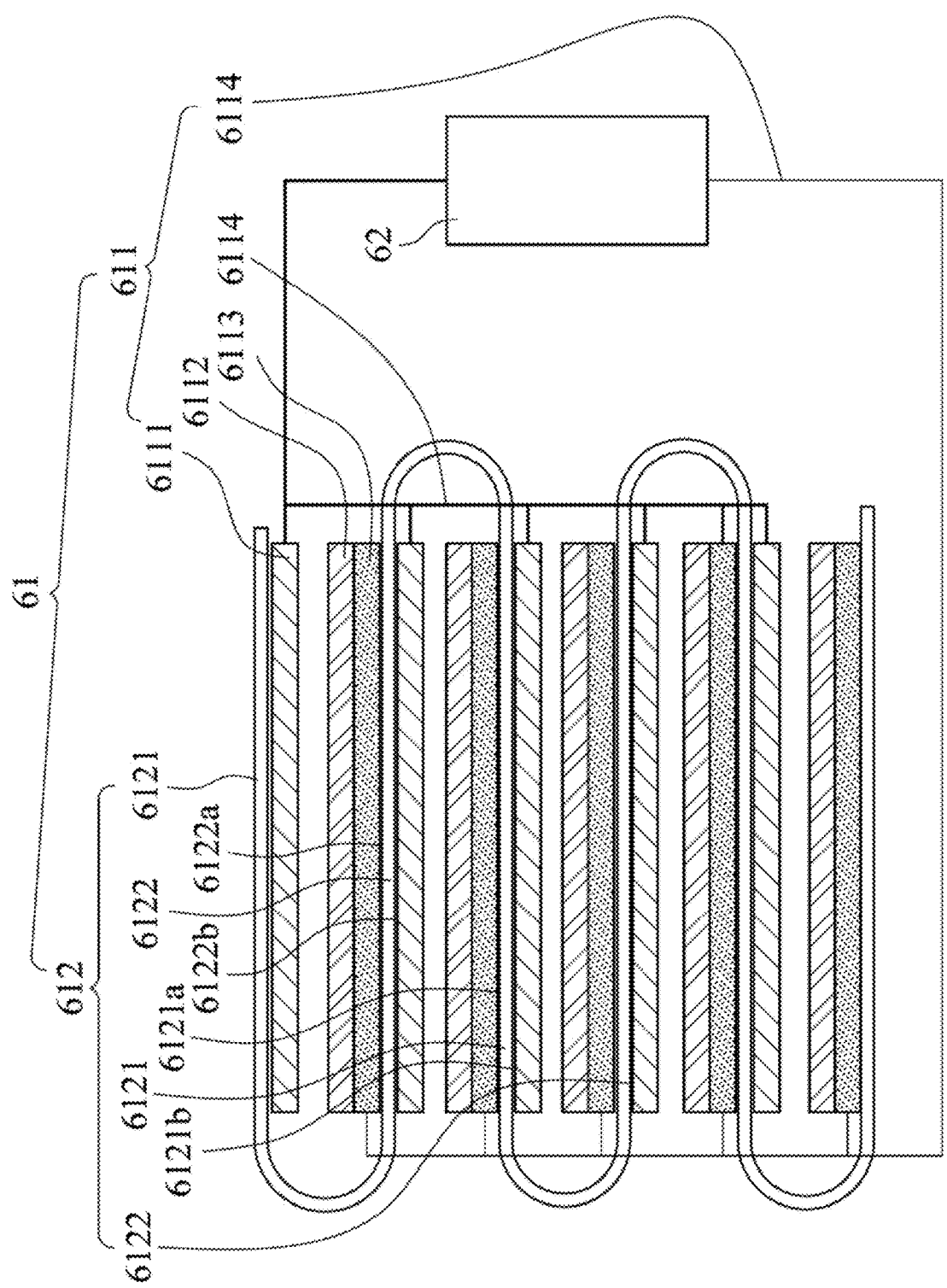
FIG. 20 shows a schematic view of a power source of FIG. 19A connecting to a wearable member.
Figure 21:
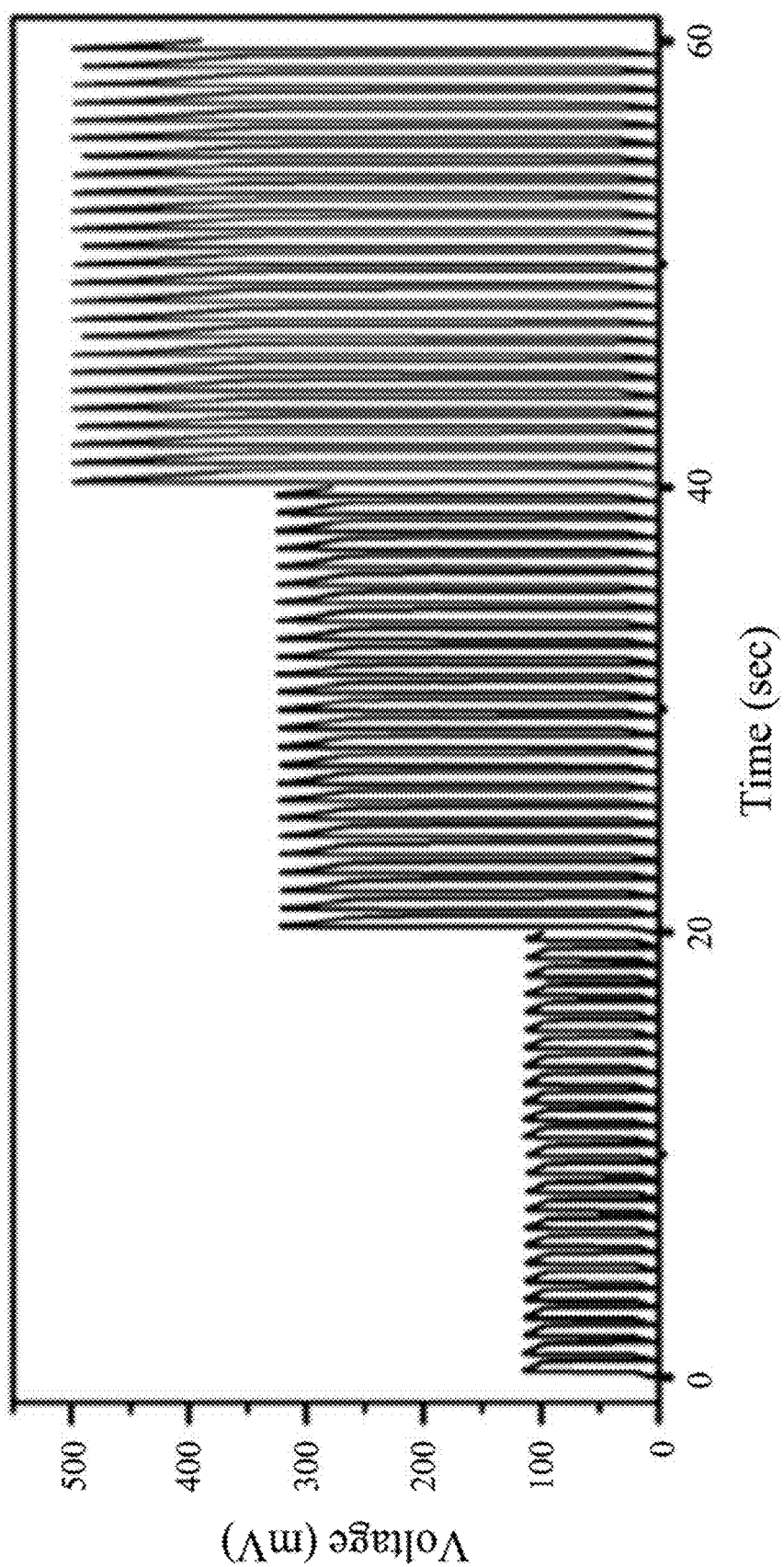
FIG. 21 shows a relation between a number of sublayers and a total output voltage.
Figure 22C:
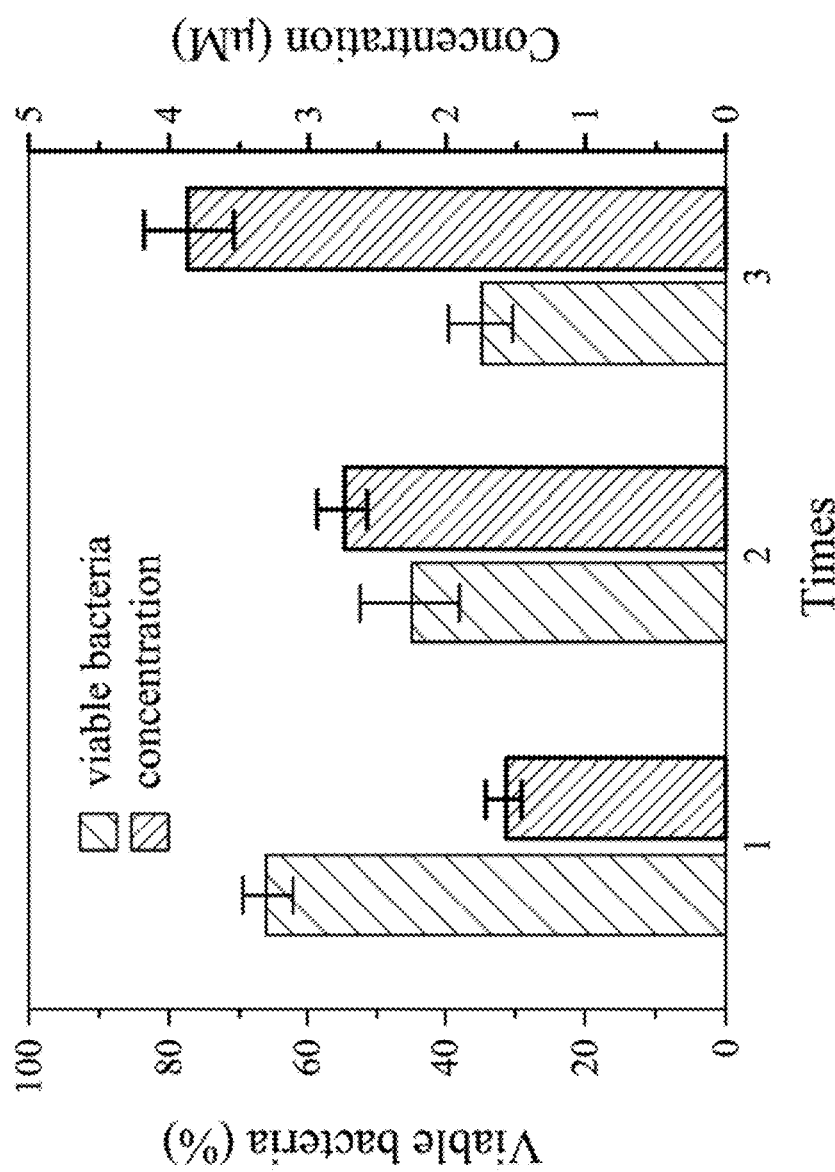
FIG. 22C is a chart showing a disinfecting effect of the disinfecting system of FIG. 19A.

FIG. 19A shows a schematic view of a disinfecting system 60 according to a fifth embodiment of the present disclosure. FIG. 19B shows a schematic view of a disinfecting layer 622 of the disinfecting system 60 of FIG. 19A. FIG. 20 shows a schematic view of a power source 61 of FIG. 19A connecting to a wearable member 62. FIG. 21 shows a relation between a number of sublayers 6121, 6122 and a total output voltage. FIG. 22A shows a system architecture of the disinfecting system 60 of FIG. 19A. FIG. 22B is a chart showing charging and discharging of the disinfecting system 60 of FIG. 19A. FIG. 22C is a chart showing a disinfecting effect of the disinfecting system 60 of FIG. 19A. The disinfecting system 60 includes the wearable member 62 and the power source 61. The wearable member 62 includes tow disinfecting layers 622, 624. The power source 61 includes a triboelectric nanogenerator structure 611, and the power source 61 is electrically connected to the disinfecting layers 622, 624 via the electric connecting member.

The wearable member 62 can have a pants structure or a top structure. The wearable member 62 includes three normal layers 621, 623, 625 and the two disinfecting layers 622, 624. The material of the normal layers 621, 623, 625 is polyester. The material of the disinfecting layers 622, 524 includes carbon fibers 6221 and a plurality of AU-Te NWs 6222. The AU-Te NWs 6222 are located at the carbon fibers 6211. In fabrication, a carbon fiber fabric made of carbon fibers 6221 is provided. The carbon fiber fabric is cleaned to remove the impurities.

Then, the carbon fiber fabric is placed in a solution containing 1.0M hydrazine monohydrate and 50 mM $Na_2TeO_3$. The solution was gradually heated to 60° C. for 3 hours, and the Te NWs were formed on the carbon fiber fabric. The growth of Au NPs on the Te NWs was conducted through the redox reaction between Te atoms and $Au^{3+}$ ions. The Te NW-coated carbon fiber fabric was placed in a $HAuCl_4$ solution to form the AU-Te NWs 6222 on the carbon fibers 6221. In other embodiment, the disinfecting layer can be made by other material which can disinfect after powered, and the present disclosure is not limited thereto.

The triboelectric nanogenerator structure 611 is similar to the triboelectric nanogenerator structure 20 of the first embodiment and includes an upper electrode layer 6111, a lower triboelectric layer 6112, a lower electrode layer 6113 and an electric connecting member 6114. The materials of the lower triboelectric layer 6112 and the electrode layer 6113 are different from that of the first embodiment, and the lower triboelectric layer 6112 and the lower electric layer 6113 are made of polydimethylsiloxane and indium tin oxide, respectively.

The power source 61 can further include a flexible substrate 612. The flexible substrate 612 is folded to form a plurality of sublayers 6121, 6122, and each of the sublayers 6121, 6122 has an upper surface 6121a, 6122a and a lower surface 6121b, 6122b. The disinfecting system 60 includes a plurality of triboelectric nanogenerator structures 611. One of the upper electrode layers 6111 is disposed at one of the upper surfaces 6121a and the lower surface 6121b of one of the sublayers 6121, and one of the lower electrode layers 6113 is disposed at the other one of the upper surfaces 6121a and the lower surface 6121b of the one of the sublayers 6121.

Precisely, flexible substrate 612 is made of PET. As shown in FIG. 20, the flexible substrate 612 is folded into zigzag shape to form a plurality of sublayers 6121, 6122. In other words, through folded into zigzag shape, the sublayer 6121 and the sublayer 6122 are staggered and connected to each other.

As shown in FIG. 20, the first upper electrode layer 6111 can be disposed at the lower surface 6121b of the first sublayer 6121, and the first lower electrode layer 6113 can be disposed at the upper surface 6122a of the second sublayer 6122. The second upper electrode layer 6111 can be disposed at the lower surface 6122b of the second sublayer 6122, and the second lower electrode layer 6113 can be disposed at the upper surface 6121a of the third sublayer 6121. Each of the upper electrode layers 6111 is electrically connected to each other and is connected to the wearable member 62. Each of the lower electrode layers 6113 is electrically connected to each other and is connected to the wearable member 62.

As shown in FIG. 21, a total output of the power source 61 will be affected by a number of the triboelectric nanogenerator structures 611. Numbers of the number of the triboelectric nanogenerator structure 611 are two, six and ten in FIG. 21. When the number of the triboelectric nanogenerator structures 611 is two, the number of the sublayers 6121, 6122 is three and the triboelectric nanogenerator structures 611 are disposed on the three sublayers 6121, 6122. When the number of the triboelectric nanogenerator structures 611 is six, the number of the sublayers 6121, 6122 is seven and the triboelectric nanogenerator structures 611 are disposed on the seven sublayers 6121, 6122. When the number of the triboelectric nanogenerator structures 611 is ten, the number of the sublayers 6121, 6122 is eleven, and the triboelectric nanogenerator structures 611 are disposed on the eleven sublayers 6121, 6122. As shown in FIG. 21, the total output voltage increases while the number of the triboelectric nanogenerator structures 611 increases.

As shown in FIG. 22A, the power source 61 can be disposed at the insole, and the power source 61 can be electrically connected to a capacitor 631, a switch 632 and a rectifier 633. Hence, when the user (not labeled) is walking or running and is stepping on the triboelectric nanogenerator structures 611, the total output voltage can be rectified by the rectifier 633 to charge the capacitor 631 which can power the wearable member 62. As shown in FIG. 22B, the capacitor 631 can be charged by the power source 61 and discharged. As shown in FIG. 22C, when the discharging time increases, the disinfecting time increases, and a number of the viable bacteria is decreased. Since the $H_2O_2$ concentration generated by the disinfecting system 60 is high, the disinfecting effect is enhanced.

Based on the above-mentioned embodiments, it is known that because the triboelectric nanogenerator structure of the present disclosure has high output stability and is independent from the humidity, and when it is applied to the sensing system 30 of the second embodiment for measuring the humidity, the humidity can be accurately measured. When the triboelectric nanogenerator structure is placed on the back of the human hand and applied to the sensing system 40 of the third embodiment, the movement of the fingers can be detected without affecting by the sweat. When the triboelectric nanogenerator structure is applied to the sensing system 50 for measuring the foot positions, the output voltage will not be affected by the humidity inside the shoe. Moreover, when the triboelectric nanogenerator structure is disposed at the insole and applied to the disinfecting system 60 of the fifth embodiment, the output voltage will not be affected by the humidity inside the shoe. It is clear that the triboelectric nanogenerator of the present disclosure has a wide usage.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A triboelectric nanogenerator structure consisting of an upper electrode layer, a lower triboelectric layer, a lower electrode layer and an electric connecting member, wherein:
   the upper electrode layer consists of a hybrid gel, wherein the hybrid gel is conductive;
   the lower triboelectric layer corresponding to the upper electrode layer has a first surface and a second surface, wherein the first surface faces toward the upper electrode layer;
   the lower electrode layer is disposed at the second surface; and
   the electric connecting member connects the upper electrode layer to the lower electrode layer, wherein an electron flows from the lower electrode layer to the upper electrode layer or from the upper electrode layer to the lower electrode layer via the electric connecting member;
   wherein the first surface of the lower triboelectric layer contacts and separates from the upper electrode layer repeatedly.

2. The triboelectric nanogenerator structure of claim 1, wherein the hybrid gel comprises:
   a chitosan; and
   a glycerol mixed with the chitosan.

3. The triboelectric nanogenerator structure of claim 2, wherein a concentration of the glycerol is within a range of 15 wt % to 25 wt %.

4. The triboelectric nanogenerator structure of claim 1, wherein an output voltage of the triboelectric nanogenerator structure satisfies the following condition:

$$0.9 \leq V1/V2 \leq 1;$$

wherein V1 represents the output voltage of the triboelectric nanogenerator structure at a relative humidity of 20%, and V2 represents the output voltage of the triboelectric nanogenerator structure at the relative humidity of 80%.

5. A triboelectric nanogenerator structure, comprising:
   an upper electrode layer consists of a hybrid gel, wherein the hybrid gel is conductive;
   a lower triboelectric layer corresponding to the upper electrode layer having a first surface and a second surface, wherein the first surface faces toward the upper electrode layer;
   a lower electrode layer disposed at the second surface; and
   an electric connecting member connecting the upper electrode layer to the lower electrode layer, wherein an electron flows from the lower electrode layer to the upper electrode layer or from the upper electrode layer to the lower electrode layer via the electric connecting member;
   wherein the first surface of the lower triboelectric layer contacts and separates from the upper electrode layer repeatedly, and an output voltage of the triboelectric nanogenerator structure satisfies the following condition:

$$0.9 \leq V1/V2 \leq 1;$$

wherein V1 represents the output voltage of the triboelectric nanogenerator structure at a relative humidity of 20%, and V2 represents the output voltage of the triboelectric nanogenerator structure at the relative humidity of 80%.

6. The triboelectric nanogenerator structure of claim 5, wherein the hybrid gel comprises:
   a chitosan; and
   a glycerol mixed with the chitosan.

7. The triboelectric nanogenerator structure of claim 6, wherein a concentration of the glycerol is within a range of 15 wt % to 25 wt %.

8. A sensing system, comprising:
   a humidity sensing module, comprising:
   a humidity sensor; and
   a power source, comprising a triboelectric nanogenerator structure, wherein the triboelectric nanogenerator structure comprises an upper electrode layer consisting of a hybrid gel, a lower triboelectric layer corresponding to the upper electrode layer having a first surface and a second surface, a lower electrode layer disposed at the second surface and an electric connecting member connecting the upper electrode layer to the lower electrode layer, the first surface faces toward the upper electrode layer, and the electric connecting member of the triboelectric nanogenerator structure is connected to the humidity sensor; and a display module electrically connected to the humidity sensing module;

wherein an output voltage of the triboelectric nanogenerator structure satisfies the following condition:

$$0.9 \leq V1/V2 \leq 1;$$

wherein V1 represents the output voltage of the triboelectric nanogenerator structure at a relative humidity of 20%, and V2 represents the output voltage of the triboelectric nanogenerator structure at the relative humidity of 80%.

9. The sensing system of claim 8, wherein the display module comprises:

an LED electrically connected to the humidity sensing module.

10. The sensing system of claim 8, further comprising a wearable member and a disposing member, wherein the disposing member corresponds to the wearable member, the upper electrode layer is disposed at the wearable member and is exposed therefrom, and the lower electrode layer is disposed between the disposing member and the lower triboelectric layer.

11. The sensing system of claim 8, wherein the triboelectric nanogenerator structure further comprises:

a hollow spacer disposed between the upper electrode layer and the lower triboelectric layer;

wherein when the triboelectric nanogenerator structure is forced, the hollow spacer is deformed such that the upper electrode layer contacts the lower triboelectric layer.

12. A sensing system, comprising:

a sensing module, comprising a plurality of sensors, wherein each of the sensors contacts each of a plurality of portions of an article, and each of the sensors comprises a triboelectric nanogenerator structure, wherein the triboelectric nanogenerator structure comprises an upper electrode layer consisting of a hybrid gel, a lower triboelectric layer corresponding to the upper electrode layer having a first surface and a second surface, a lower electrode layer disposed at the second surface and an electric connecting member connecting the upper electrode layer to the lower electrode layer, the first surface faces toward the upper electrode layer; and a display module electrically connected to the sensing module;

wherein output voltages of the sensors are changeable according to motions of the portions of the article, and an output voltage of the triboelectric nanogenerator structure satisfies the following condition:

$$0.9 \leq V1/V2 \leq 1;$$

wherein V1 represents the output voltage of the triboelectric nanogenerator structure at a relative humidity of 20%, and V2 represents the output voltage of the triboelectric nanogenerator structure at the relative humidity of 80%.

13. The sensing system of claim 12, further comprising a disposing member corresponding to the article, wherein each of the lower electrode layers are disposed at the disposing member, and the article contacts each of the sensors to cause each of the sensors to produce the output voltage.

14. The sensing system of claim 12, wherein the triboelectric nanogenerator structure further comprises:

a hollow spacer disposed between the upper electrode layer and the lower triboelectric layer;

wherein when the triboelectric nanogenerator structure is forced, the hollow spacer is deformed such that the upper electrode layer contacts the lower triboelectric layer.

15. A disinfecting system, comprising:

a wearable member, comprising a disinfecting layer; and a power source, comprising a triboelectric nanogenerator structure, wherein the triboelectric nanogenerator structure comprises an upper electrode layer consisting of a hybrid gel, a lower triboelectric layer corresponding to the upper electrode layer having a first surface and a second surface, a lower electrode layer disposed at the second surface and an electric connecting member connecting the upper electrode layer to the lower electrode layer, the first surface faces toward the upper electrode layer, the electric connecting member of the triboelectric nanogenerator structure is electrically connected to the disinfecting layer, and an output voltage of the triboelectric nanogenerator structure satisfies the following condition:

$$0.9 \leq V1/V2 \leq 1;$$

wherein V1 represents the output voltage of the triboelectric nanogenerator structure at a relative humidity of 20%, and V2 represents the output voltage of the triboelectric nanogenerator structure at the relative humidity of 80%.

16. The disinfecting system of claim 15, wherein the power source further comprises a flexible substrate, the flexible substrate is folded to form a plurality of sublayers, each of the sublayers has an upper surface and a lower surface, the disinfecting system comprises a plurality of triboelectric nanogenerator structures, one of the upper electrode layers is disposed at one of the upper surface and the lower surface of one of the sublayers, and one of the lower electrode layers is disposed at the other one of the upper surface and the lower surface of the one of the sublayers.

* * * * *